US011902482B2

(12) United States Patent
Okuno

(10) Patent No.: US 11,902,482 B2
(45) Date of Patent: Feb. 13, 2024

(54) SCANNER CONFIGURED TO TRANSMIT SCAN DATA IN RESPONSE TO OPERATION KEY BEING OPERATED, SCANNING SYSTEM, AND NON-TRANSITORY COMPUTER-READABLE RECORDING MEDIUM CONTAING COMPUTER-EXECUTABLE INSTRUCIONS FOR SCANNER

(71) Applicant: BROTHER KOGYO KABUSHIKI KAISHA, Nagoya (JP)

(72) Inventor: Tetsuya Okuno, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 17/533,255

(22) Filed: Nov. 23, 2021

(65) Prior Publication Data
US 2022/0166890 A1 May 26, 2022

(30) Foreign Application Priority Data

Nov. 26, 2020 (JP) .................................. 2020-195769

(51) Int. Cl.
*H04N 1/00* (2006.01)
(52) U.S. Cl.
CPC ..... *H04N 1/00389* (2013.01); *H04N 1/00315* (2013.01); *H04N 1/00411* (2013.01)
(58) Field of Classification Search
CPC ........... H04N 1/00209; H04N 1/00389; H04N 1/00501
See application file for complete search history.

(56) References Cited

U.S. PATENT DOCUMENTS

| 9,019,528 | B2* | 4/2015 | Mihara | H04N 1/00464 358/1.14 |
| 2010/0134826 | A1* | 6/2010 | Ishigure | H04N 1/0035 358/1.15 |
| 2011/0128564 | A1* | 6/2011 | Kayama | H04N 1/00973 358/1.13 |
| 2013/0201514 | A1* | 8/2013 | Terao | H04N 1/4426 358/1.14 |
| 2014/0327787 | A1* | 11/2014 | Tsujimoto | H04N 1/00328 348/207.2 |
| 2017/0064131 | A1* | 3/2017 | Morita | H04N 1/00244 |
| 2017/0094121 | A1* | 3/2017 | Mizuno | H04N 1/4433 |
| 2017/0272594 | A1* | 9/2017 | Yamada | H04N 1/0097 |
| 2018/0338054 | A1 | 11/2018 | Fujiwara | |
| 2019/0089862 | A1* | 3/2019 | Sugawara | H04N 1/00212 |
| 2020/0162624 | A1* | 5/2020 | Tsukada | H04N 1/00331 |
| 2020/0412888 | A1* | 12/2020 | Kawanishi | G06F 3/1291 |
| 2021/0127036 | A1* | 4/2021 | Morishita | H04N 1/32368 |
| 2021/0385355 | A1* | 12/2021 | Hosoda | H04N 1/00413 |

FOREIGN PATENT DOCUMENTS

JP 2018-195100 A 12/2018

* cited by examiner

*Primary Examiner* — Benjamin O Dulaney
(74) *Attorney, Agent, or Firm* — Scully, Scott, Murphy & Presser, P.C.

(57) ABSTRACT

A controller of a scanner is configured to determine whether use ID associated with a destination is stored in a memory. When it is determined that the user ID is not stored, the controller disables an operation key, and when it is determined that the user ID is stored, the controller enables the operation key. When the enabled operation key is operated, the controller executes a push scan process that generated scan data is transmitted to the destination.

17 Claims, 11 Drawing Sheets

| USER ID | DISPLAY NAME | SCAN SETTING |
|---|---|---|
| User1 | UserA | A4, 200 dpi, MONOCHROME, MULTI-PAGE |
| User2 | UserB | A4, 300 dpi, COLOR, ONE-SIDED |
| User3 | UserC | A4, 200 dpi, MONOCHROME, ONE-SIDED |
| ... | ... | ... |
| UserN | ... | ... |

SCANNER CONFIGURED TO TRANSMIT SCAN DATA IN RESPONSE TO OPERATION KEY BEING OPERATED, SCANNING SYSTEM, AND NON-TRANSITORY COMPUTER-READABLE RECORDING MEDIUM CONTAING COMPUTER-EXECUTABLE INSTRUCIONS FOR SCANNER

CROSS-REFERENCE TO RELATED APPLICATIONS

This application claims priority under 35 U.S.C. § 119 from Japanese Patent Application No. 2020-195769 filed on Nov. 26, 2020. The entire subject matter of the application is incorporated herein by reference.

BACKGROUND

The present disclosures relate to a technique of transmitting scan data to a particular destination.

There has been known a scanner configured to perform a scanning process. The scanner generally generates scan data representing an image scanned from an original document and transmit the generated scan data to a pre-registered destination.

SUMMARY

In a conventional scanner as described above, destinations can be registered or deleted. Accordingly, in a situation where a user uses a scanning process, a particular destination may not be registered (e.g., may have been registered but deleted). In such a case, there is a concern that, even if the user operates a user interface, a push-scan may not be performed.

According to aspects of the present disclosures, there is provided a scanner, comprising a scanning engine configured to scan an image on an original document and generate scan data representing the image on the original document, a memory, a user interface provided with an operation key, and a controller. The controller is configured to perform storing destination information in the memory, the destination information corresponding to a destination to which the scan data is to be transmitted, determining whether the destination information is stored in the memory, when it is determined, in the determining, that the destination information is not stored in the memory, disabling the operation key, when it is determined, in the determining, that the destination information is stored in the memory, enabling the operation key, and when the enabled operation key is operated in a state where the operation key is enabled, transmitting the scan data as generated to the destination indicated by the destination information.

DETAILED DESCRIPTION

First Embodiment

Hereinafter, a scanning system 100 according to a first embodiment of the present disclosures will be described with reference to the accompanying drawings.

Figure 1:
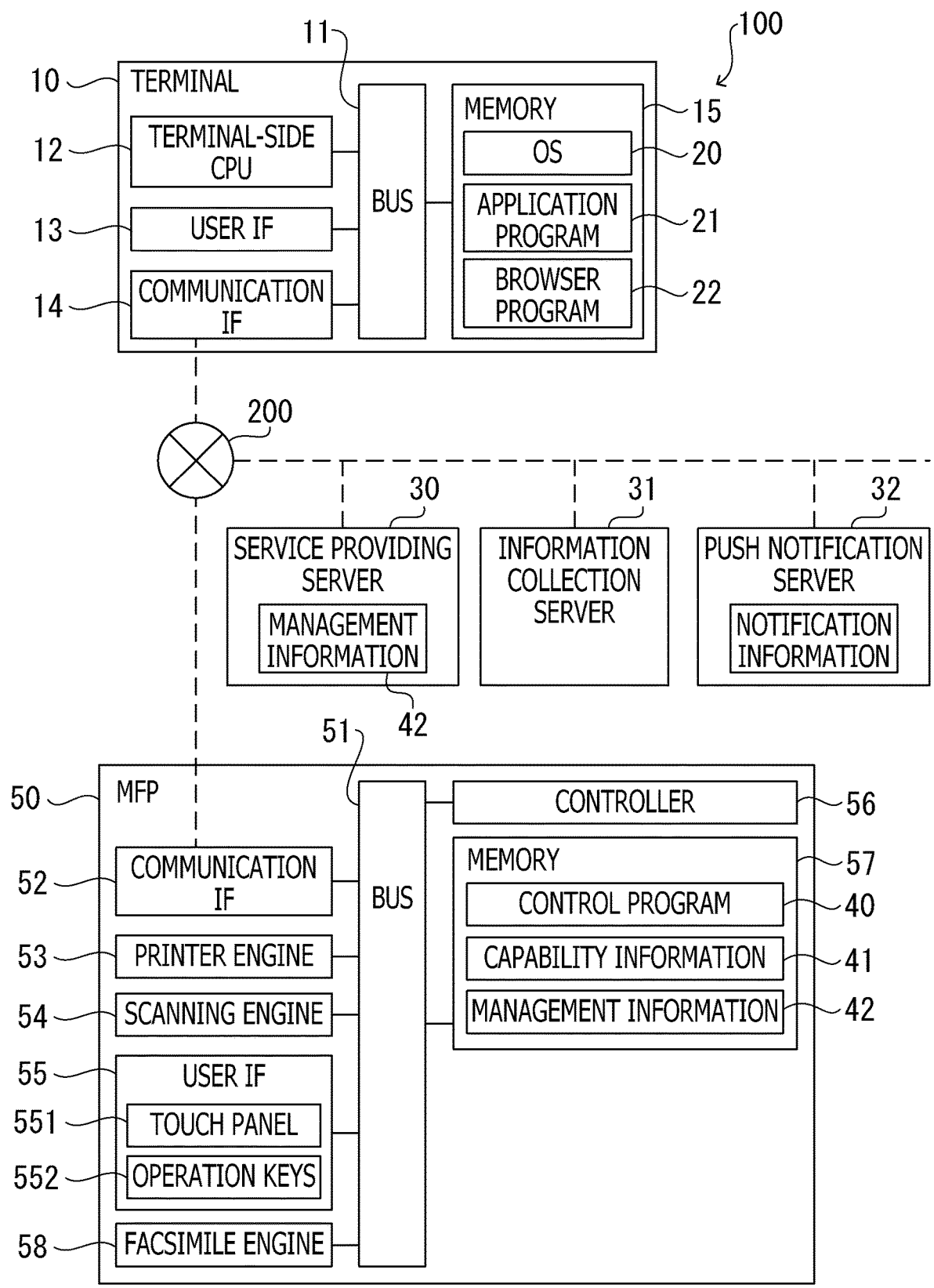
FIG. 1 is a block diagram illustrating a configuration of a scanning system.

The scanning system 100 shown in FIG. 1 has a terminal 10, servers 30, 31, 32, and an MFP (Multi-Function Peripheral/Printer/Product) 50. The terminal 10, the servers 30, 31, 32, and the MFP 50 are connected to a network 200. In the present embodiment, the network 200 may be the Internet, a local area network (LAN), or a combination of a LAN and the Internet. In addition, the network 200 may be a wired, or wireless network, or may include a combination of wired and wireless networks. In the present embodiment, the terminal 10 and the MFP 50 are connected wirelessly to a well-known router that constitutes a part of the network, and the terminal 10 or the MFP 50 is connected to the servers 30, 31, 32 via the Internet. In the present embodiment, the MFP 50 is an example of a scanner.

A hardware configuration of the MFP 50 will be described. The MFP 50 is provided with a bus 51, a communication IF 52, a printer engine 53, a scanning engine 54, a user IF 55, a controller 56, a memory 57, and a facsimile engine 58. Components constituting the MFP 50 are interconnected for communication via the bus 51. It is noted that a term "IF" is an abbreviation for an Interface.

The communication IF 52 is configured to connect the MFP 50 to the network 200 in accordance with a particular communication protocol. For example, the communication IF 52 is configured to perform wireless communication according to the Wi-Fi® (Wireless Fidelity certified by Wireless Alliance) based on the IEEE 802.11 standard and equivalent standards. The communication IF 52 may be configured to perform short-range wireless communication such as Bluetooth® with the terminal 10.

The user IF 55 is an interface that intervenes between the controller 56 and the user, and in this embodiment, the user IF 55 has a touch panel 551 and operation keys 552 as physical keys. The touch panel 551 has a touch sensor, and outputs a signal according to a detection result by the touch sensor. The term "touch" in this embodiment includes the overall operation of bringing the input medium into contact with the display screen of the touch panel 551. In addition, bringing the input medium close to the touch panel 551 to a position where the distance between the input medium and the touch panel 551 is very small may be included in the aforementioned concept of "touch" It is noted that the input medium may be a user's finger, a touch pen, or the like.

The printer engine 53 is configured to perform a printing operation to print an image on a recording medium such as a printing sheet or a disk. As a recording method of the printer engine 53, an inkjet method in which ink as a recording agent is ejected onto the recording medium, or an electrophotographic method in which a toner image is formed on a photosensitive member and the formed toner image is transferred onto the recording medium may be employed. The scanning engine 54 is configured to perform a scanning process to generate scan data by scanning an image recorded on an original document. The controller 56 of the MFP 50 causes the scanning engine 54 to generate the scan data by scanning the original document set on an ADF (Auto Document Feeder) or a reading table. The facsimile engine 58 is configured to perform a facsimile process according to a particular protocol. It is noted that the MFP 50 may be configured to perform a combined operation that is a combination of multiple operations described above. The copying process, which is a combination of the print operation by the printer engine 53 and a scan operation by the scanning engine 54, is an example of the combined operation.

In the present embodiment, the scanning process includes the individual functions of "Scan to File," "Scan to Email," "Scan to Mobile," "Scan to OCR." "Scan to Image," and "Scan to Media." The "Scan to File" is a process of storing the scan data in an FTP server connected to the network 200. The "Scan to Email" is a process of transmitting the scan data by email to a designated email address. The "Scan to OCR" is a process of converting the scan data into text data. The "Scan to Image" is a process in which a graphic application is started to edit the scan data. The "Scan to Media" is a process of storing the scan data into an external media such as a USB memory connected to the MFP 50.

The "Scan to Mobile" is a process of causing the MFP 50 to generate the scan data and upload the generated scan data to the service providing server 30 in response to receipt of an instruction from the user to execute the scanning process via the user IF 55. The scan data uploaded to the service providing server 30 can be downloaded by operating the terminal 10. In the present embodiment, the "Scan to Mobile" is an example of the push scan process.

The controller 56 includes a CPU, an ASIC (Application Specific Integrated Circuit), and the like, and is configured to control each operation of the printer engine 53, the scanning engine 54, and the user IF 55. The memory 57 is configured to various programs executed by the controller 56.

In the present embodiment, the memory 57 includes, for example, a combination of a RAM, a ROM, and a flash memory. The memory 57 may be a storage medium that can be read by the controller 56, which serves a kind of a computer. The storage medium includes a recording medium such as a CD-ROM, a DVD-ROM, and the like. The same applies to the memory 15 that will be described below.

A control program 40 is stored in the memory 57. By executing the control program 40, the controller 56 performs each of the above-described operations, such as the scanning process, the printing process, and the facsimile process. Also, in the data storage area of the memory 57, the capability information 41 and the management information 42 (FIG. 2) are stored as data to which the controller 56 refers.

The capability information 41 includes a plurality of items indicating capabilities of the MFP 50, and is, for example, information in a structure form. The capability information 41 stores the items of "original document size." "resolution," "color setting," "scanning format," and "file format" as items related to the scanning process. The "document size" is information indicating a scanning range of the original document when the MIT 50 performs the scanning process. For example, the "A4" is information indicating that the MFP 50 scans a document within a scanning range of A4 size, and the "Auto" is information indicating that the MFP 50 automatically adjusts the reading range according to the original document. The "Resolution" is information indicating a resolution of the scan data when scanning is performed. The "color setting" is information for setting whether the color of the scanned data is used when the MFP 50 performs scanning process, and includes, for example, the items of "color" and "monochrome." The "scanning format" is information indicating the surface(s) (double-sided or single-sided) of the original document subjected to be scanned when the MFP 50 performs the scanning process. The "file format" is information indicating a file format (JPEG, TIFE) of the scanned data to be used when the MFP 50 performs the scanning process. The items of "ADF tilt correction," "brightness," "contrast," and "blank paper removal" may be included as items of the capability information 41.

Figures 2, 3:
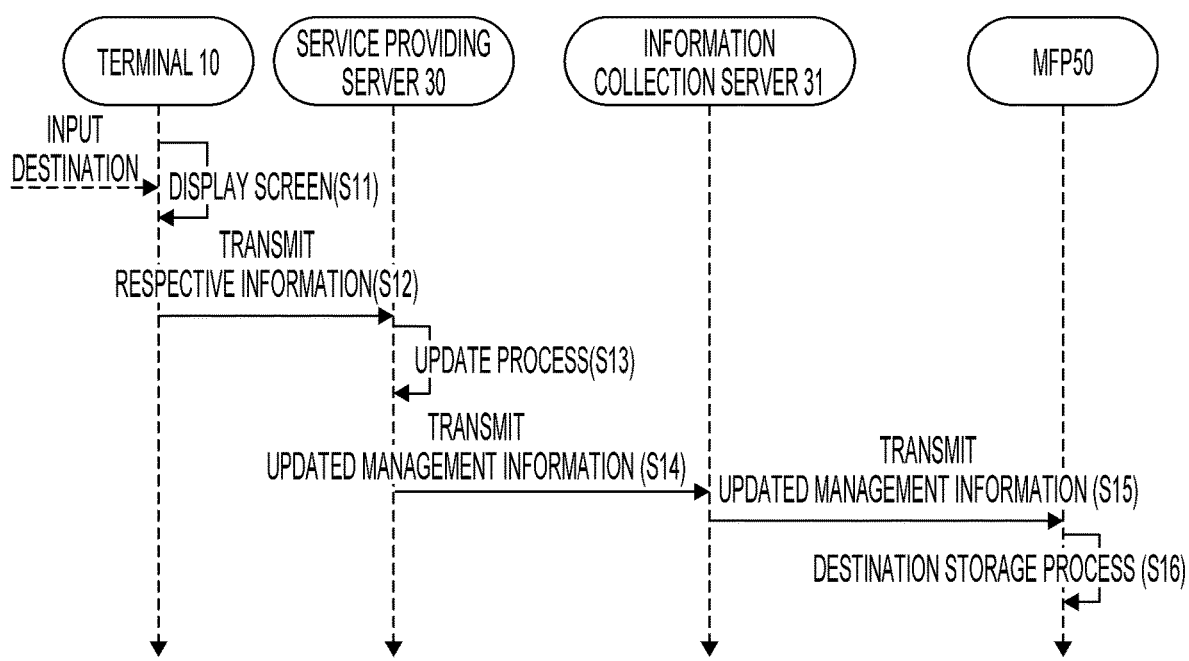
FIG. 2 schematically illustrates a data structure of management information.
FIG. 3 is a sequence chart illustrating an updating process of the management information.

In the management information 42, information on the destinations registered in the "Scan to Mobile" is stored. In the present embodiment, as shown in FIG. 2, the management information 42 includes the items of the "user ID," the "display name," and the "scan settings." Among the items in the management information 42, the "user ID" is information assigned to manage a device that is a destination used in the scanning system 100. The "display name" is information indicating a display name when the destination is displayed on the user IF 55 of the MFP 50. In the present embodiment, the display name is an example of the information for identifying the destination. The "scan setting" is a scan setting when performing the scan process targeting the destination, and can be set within the range indicated by the capability information 41. In addition to the above, the management information 42 may include identification information that identifies the destination device, such as a MAC address of the device and/or a program ID of the control program 40.

Next, the servers 30, 31, and 32 will be described. Each of the servers 30, 31, 32 is equipped with a CPU that serves as a computer, a communication IF, and a memory. The service providing server 30 is a server to which the scan data created by the MFP 50 is uploaded. The service providing server 30 is configured to cause the uploaded scan data to be downloaded to the terminal 10 in response to instructions from the terminal 10. The information collection server 31 is a server that manages the management information 42.

The push notification server 32 is a server configured to transmit a push notification to a destination device when the scan data is uploaded to the service providing server 30. As an example of a mechanism by which the push notification server 32 provides push notifications, an APNS (Apple Push Notification Service) and/or a GCM (Google Cloud Messaging for Android) can be used. In the present embodiment, it is assumed that, when the services of the APNS or GCM is used, the push notification server 32 registers, as notification information, an address indicating the location of a destination device in association with the push notification Ill, and that the destination device obtains the push notification ID from the push notification server 32. It is further assumed that the destination device has obtained the push notification ID from the push notification server 32. It is noted that the push notification is a notification according to the protocol of APNS or GCM, and the "push notification ID" is information that identifies a destination when the push notification is to be performed.

Next, the terminal 10 will be described. The terminal 10 is, for example, a smart phone or a tablet terminal. The terminal 10 is provided with a bus 11, a terminal-side CPU 12, a user IF 13, a communication IF 14, and a memory 15. These components are communicatively connected to each other via the bus 11.

The user IF 13 has the same configuration as the user IF 55 of the MFP 50, and is provided with a touch panel and operation keys. The communication IF 14 has the same configuration as the communication IF 52 of the MFP 50. The communication IF 14 may be a wireless communication using a mobile communication system via a base station.

The terminal-side CPU 12 controls each part of the terminal 10 by executing a program stored in the memory 15. Stored in the memory 15 are an OS (Operating System) 20, an application program 21, and a browser program 22. In the following description, the application program will be simply referred to as "application." Further, the CPU that executes the program may also be described simply by the program name. For example, the description "the application 21" may mean "the terminal-side CPU 12 that executes the application 21."

In the present embodiment, the processes of the CPU according to the instructions described in the program will be mainly shown. That is, processes such as "determination," "extraction," "selection," "calculation," "decision," identification, "obtaining," "reception." "control," and the like in the following description represent processes by the CPU or the controller. The processes by the CPU include hardware control via the OS 20. It is noted that "obtaining" is used in a concept that does not require a request. In other words, the process of receiving data without a request by the application 21 is also included in the concept of "obtaining data by the CPU." Further, the term "data" in this specification is expressed in a computer-readable form. Further, the data having the same substantive meaning content but different formats will be treated as the same data. The same applies to "information" in the present specification.

The OS 20 has an API (Application Programming Interface) that enables the application 21 to use the functions provided by the OS 20, to communicate with the servers 30, 31, 32 and the MFP 50, and to use the functions of other programs. The application 21 is configured to instruct to perform the print process, the scanning process, and the like to the MFP 50 which is configured to be connected through the communication IF 14 by the function of the OS 20. The browser program 22 is configured to communicate with the MFP 50 or the servers 30, 31, 32 and display web page data transmitted from the MFP 50.

Next, referring to FIG. 3, a process of performing registration or deletion of destinations used in the process "Scan to Mobile" will be described. Among the processes shown in FIG. 3, the process performed by the terminal 10 is performed by the application 21, and the process performed by the MFP 50 is performed by the control program 40. In the following description, it is assumed that the network connection among the terminal 10, the MFP 50, and the servers 30 and 31 has already been established.

In S11, the application 21 displays a registration screen on the user IF 13, and receives an input operation by the user via the user IF 13. The registration screen is a screen for registering or deleting information of the terminal 10 to the management information 42 in accordance with the input operation by the user. When registering a new destination, the user designates the MFP 50 on the registration screen displayed on the user IF 13, and inputs a display name and scan settings as information about the destination (i.e., the terminal 10) to be registered. On the other hand, when deleting a destination that has already been registered, the information about the destination to be deleted is deleted on the registration screen. In the description below, a case where a destination is registered will be explained as an example.

In S12, the application 21 transmits, as the destination of the push scan process of the MFP 50, the device ID of the MFP 50, the display name and the scan setting for which the input is received in S11, and the push notification ID of the device itself, together with the registration request. The device ID is information for identifying the MFP, and may be obtained, in advance, by the application 21 from the MFP 50 or the like. In S13, the service providing server 30 performs an update process of storing each information transmitted from the terminal 10 in the management information 42. Concretely, a user ID is assigned to the destination to be registered, and the display name and the scan setting related to the destination are associated with this user ID and stored. In the present embodiment, an upper limit is defined for the number of user IDs that can be managed by the management information 42. For example, in the management information 42 shown in FIG. 2, information (display name, scan settings, and push notification ID) related to a device that is a destination can be associated with and stored for N user IDs from "User1" to "UserN" (N being an integer of 1 or greater). When a new destination is registered, a user ID to which no information about the device is associated is assigned from among the N user IIIs, and information about the destination is stored for the assigned user ID. Although not shown in FIG. 2, in the management information 42 stored in the service providing server 30, the push notification ID transmitted from the device that is the destination and the device ID are stored in association with the user ID.

In S14, the service providing server 30 transmits the management information 42 updated in S13 to the information collection server 31 together with the device ID. In the present embodiment, the service providing server 30 transmits the management information 42 to the information collection server 31 in a batch to which the information of the newly destination device has been added. It is noted that, in S14, the service providing server 30 may be configured to transmit a URL indicating an address of the device itself to the information collection server 31 together with the management information 42.

In S15, the information collection server 31 transmits the updated management information 42 and the device ID transmitted from the service providing server 30 to the MFP 50 as they are. The device ID may be stored in the memory 57 of the MFP 50, in advance, prior to the process shown in FIG. 4.

When the control program 40 of the MFP 50 receives the updated management information 42 transmitted from the information collection server 31, the control program 40 performs a destination storage process in S16. In the destination storage process, the control program 40 updates the management information 42 in a batch by overwriting the management information 42 currently stored in the memory 57 with the received updated management information 42. As a result, the control program 40 registers the terminal 10 as a destination. In the management information 42 stored in the memory 57 of the MFP 50, the device ID transmitted from the information collection server 31 is stored in association with the user ID.

Figure 4:
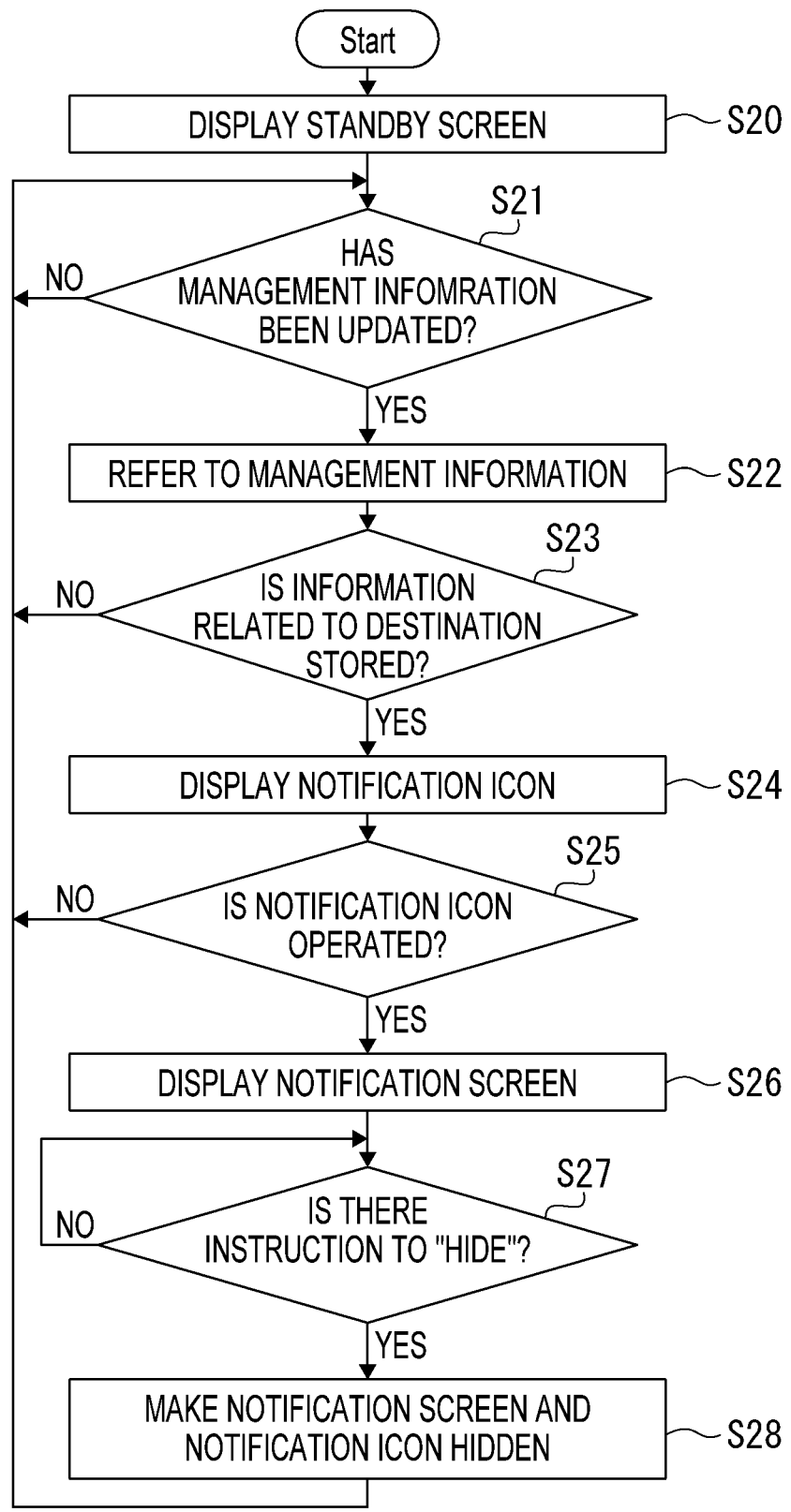
FIG. 4 is a flowchart illustrating a process after a standby screen is displayed.
Figure 5:
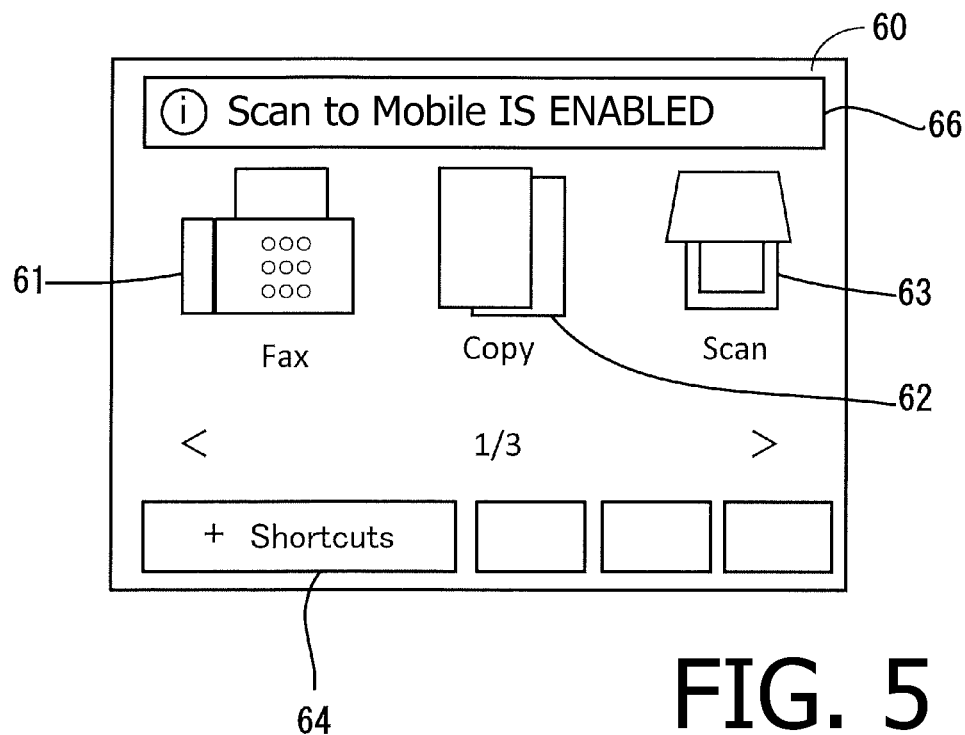
FIG. 5 illustrates an example of the standby screen.

Next, the process by the controller 56 when a destination is registered by storing information about a new destination in the management information 42 will be described referring to FIG. 4. In S20, the standby screen is displayed. The standby screen is a screen that is displayed on the touch panel 551 of the user IF 55 upon the main power of the MFP 50 being turned on. As shown in FIG. 5, the standby screen 60 is a screen for receiving operations for designating processes that can be performed by the MFP 50. In the present embodiment, the standby screen 60 includes a facsimile designation icon 61, a copy designation icon 62, a scan designation icon 63, and a shortcut icon 64. The facsimile designation icon 61 is an icon that receives an execution operation for a facsimile process. The copy designation icon 62 is an icon that receives an execution operation for copy processing. The scan designation icon 63 is an icon that receives an execution operation for a scan process. The shortcut icon 64 is an icon that receives an instruction to display a shortcut screen including shortcut keys that have already been registered.

In S21, it is determined whether the management information 42 has been updated. As described above, when a destination is registered or deleted, the management information 42 after the update is transmitted in a batch from the service providing server 30 via the information collection server 31, and the management information 42 stored in the memory 57 is updated. In the present embodiment, the control program 40 stores, in the memory 57, the history information indicating the update of the management information 42. By referring to this stored history information, it is determined whether the management information 42 has been updated. When it is determined that the management information 42 has not been updated (S21: NO), the program returns to S21.

When it is determined that the management information 42 has been updated (S21: YES), the program proceeds to S22 and refers to the management information 42. In S23, it is determined whether information about a new destination including a user ID is stored in management information 42. When no information on the destination is stored by updating the management information 42 (S23: NO), the method returns to S21. On the other hand, when the information about the destination including the user ID is stored by updating the management information 42 (S23: YES), the program proceeds to S24.

In S24, the program displays a notification icon on the standby screen 60. In the standby screen 60 shown in FIG. 5, a notification icon 66 is displayed in an upper part. The notification icon 66 includes a text image indicating that the individual function "Scan to Mobile" is now executable as the new destination has been registered. In the present embodiment, the user ID is an example of the destination information.

In S25, the program determines whether an operation on the notification icon 66 displayed in S24 is detected. When the operation to the notification icon 66 is not detected (S25: NO), the program returns to S21. On the other hand, when the operation on the notification icon 66 is detected (S25: YES), the program proceeds to S26.

Figure 6:
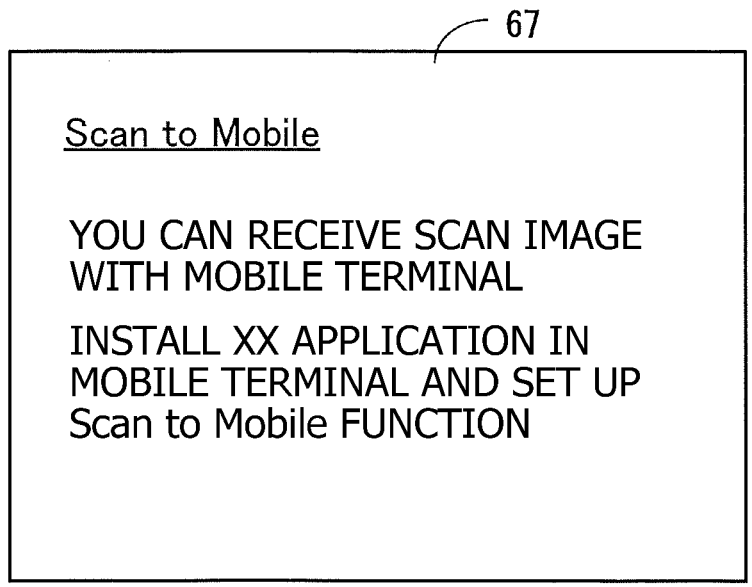
FIG. 6 illustrates an example of a notification screen.

In S26, the program displays a notification screen indicating that the individual function "Scan to Mobile" has become executable on the user IF 55. In the notification screen 67 shown in FIG. 6, a text image is displayed to indicate that the individual function "Scan to Mobile" has become executable as a destination has been registered. Further, the notification screen 67 shows a text image that makes the terminal 10 install an application program for executing the individual function of the "Scan to Mobile." When the application program has already been installed, the text image notifying that the application program is to be installed may not be displayed on the notification screen 67. In the present embodiment, the process executed by the control program 40 in S24 to S26 is an example of the notification process.

When an instruction operation to hide the notification screen 67 is detected (S27: YES), the program proceeds to S28. In S28, the notification screen 67 and the notification icon 66 displayed on the standby screen 60 are hidden. Then, the program returns to S21.

Figure 7:
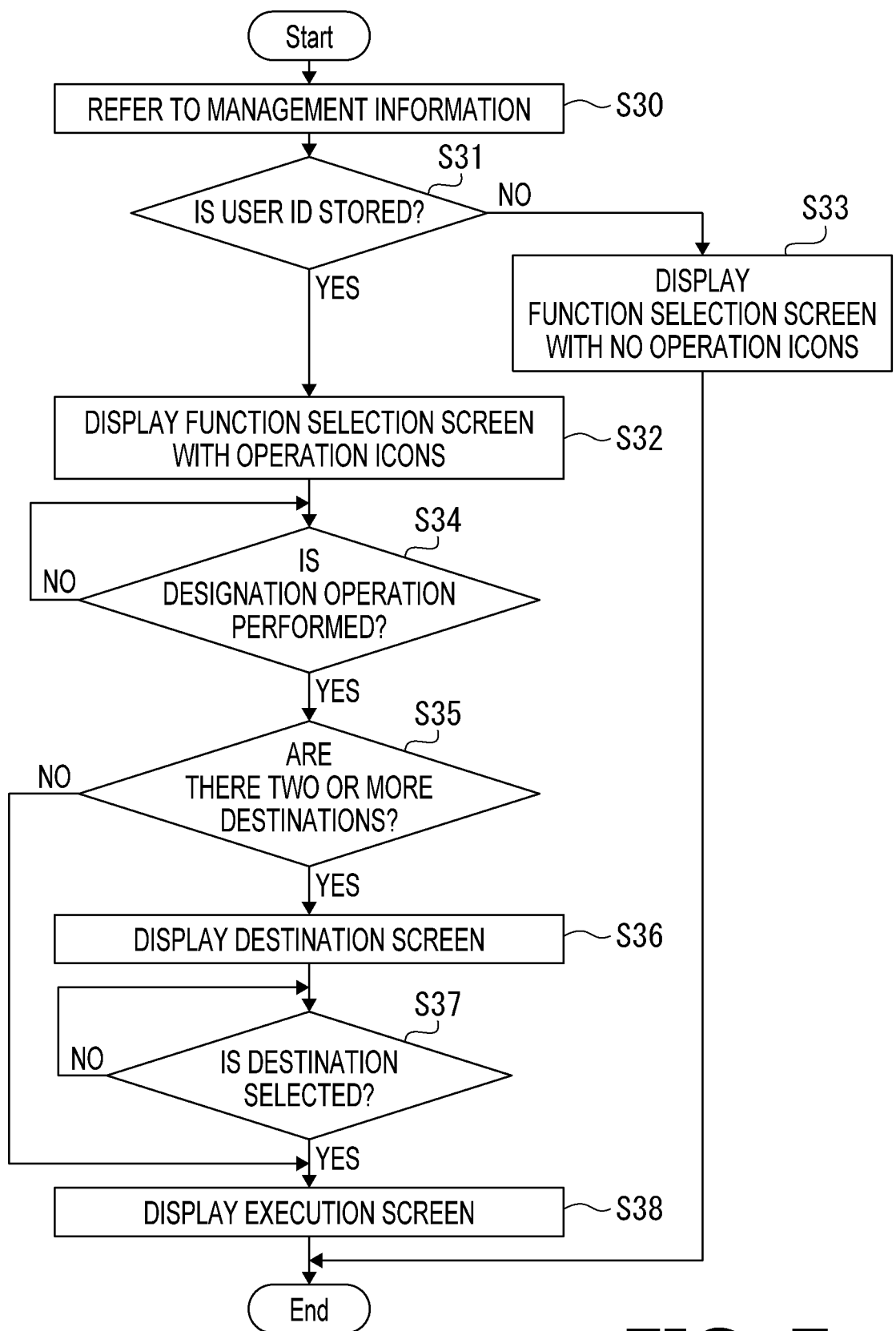
FIG. 7 is a flowchart illustrating a process which is performed when an operation icon is disabled.

Next, a process executed in response to the operation of the scan designation icon 63 on the standby screen 60 will be described referring to FIG. 7.

In S30, the control program 40 refers to the management information 42 stored in the memory 57. In S31, the control program 44) determines whether a user ID is stored in the management information 42. When the user ID is stored in the management information 42 (S31: YES), the control program 40 proceeds to S32 to display a function selection screen with an operation icon corresponding to the "Scan to Mobile" on the user IF 55.

Figure 8:
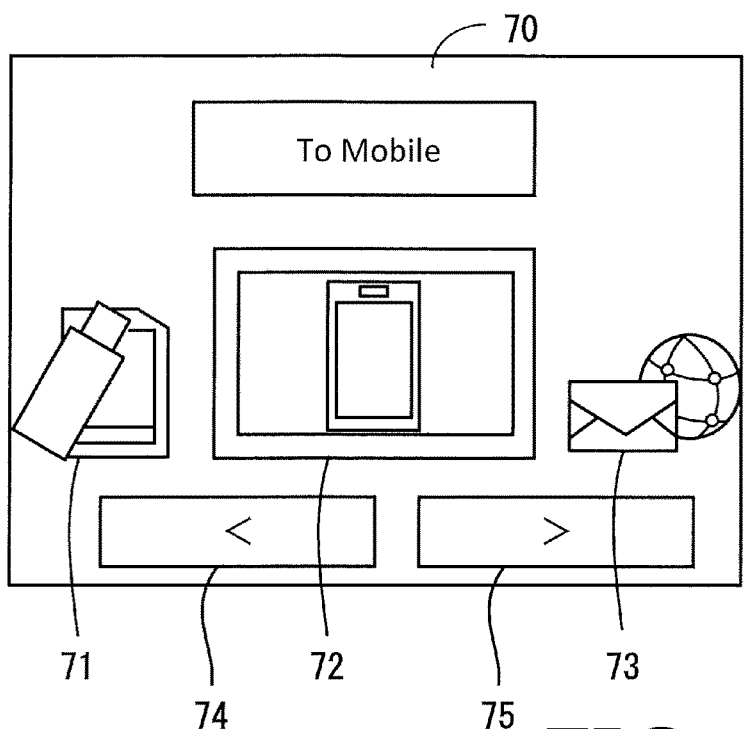
FIG. 8 illustrates an example of a function selection screen.

As shown in FIG. 8, the function selection screen 70 displayed on the user IF 55 in S32 includes operation icons 71, 72, and 73 for receiving the selection of a process among the scanning processes. Among the operation icons 71-73, the operation icon 71 is an icon for receiving an instruction operation of the individual function of the "Scan to Media." The operation icon 72 is an icon that receives an instruction for the individual function of the "Scan to Mobile." The operation icon 73 is an icon that receives an instruction for the function of the "Scan to Email." In the present embodiment, according to the operation of the change icons 74 and 75, the operation icons 71 to 73 can be positioned in the center on the function selection screen 70 so that they can be set to receive the designated operation by the user. In the function selection screen 70 shown in FIG. 8, the operation icon 72 is set to be an icon capable of receiving an instruction by a user.

When the control program 40 detects that the operation icon 72 has been operated (S34: YES) on the function selection screen 70 displayed in S32, the control program 40 proceeds to S35. When the control program 40 detects that operation icons 71 and 73 have been operated on the function selection screen 70, a process different from that shown in FIG. 7 is executed.

In S35, the control program 40 determines whether two or more destinations have been registered in the management information 42. For example, when two destinations have been registered by the process shown in FIG. 3, the management information 42 stores user Ills for two cases and display names associated with the user IDs and the like, respectively (S35: YES). In such a case, the control program 40 proceeds to S36.

Figure 9:
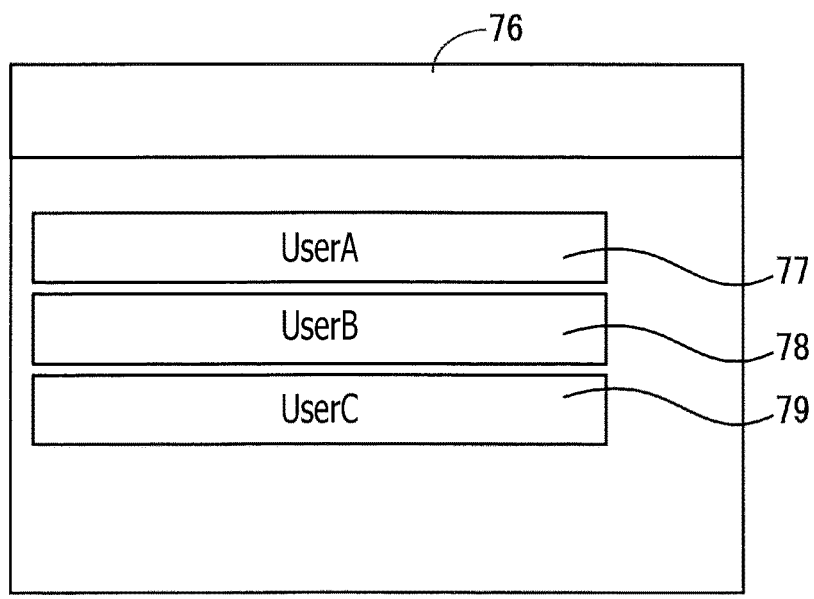
FIG. 9 illustrates an example of a destination screen.

In S36, the control program 40 display the destination screen on the user IF 55. The destination screen is a screen in which display names stored in the management information 42 are listed. The destination screen 76, an example of which is shown in FIG. 9, includes destination icons 77, 78, and 79 for receiving the designation of a destination. On the destination icons 77, 78 and 79, the display names "User A,"

"User B," and "User C" are displayed, among the display names stored in the management information 42, respectively.

Figure 10:
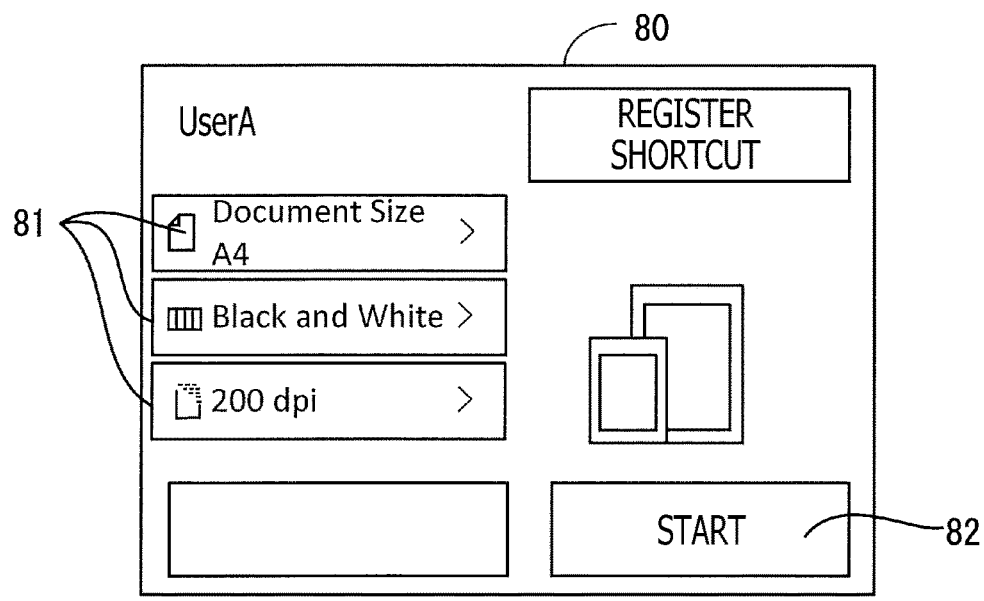
FIG. 10 illustrates an example of a scan execution screen.

In S37, the control program 40 determines whether the designation operation of any of the destination icons 77-79 included in the destination screen 76 is detected. When none of the destination icons 77-79 is operated (S37: NO), the control program 40 stands by. On the other fund, when it is determined that any of the destination icons 77-79 is operated (S37: YES), the control program 40 displays the scan execution screen 80 shown in FIG. 10 on the user IF 55. The scan execution screen 80 is a screen for receiving an instruction to execute the process of "Scan to Mobile" targeted to the designated destination. The scan execution screen 80 shown in FIG. 10 is a screen that is displayed when the destination icon 77 is operated on the destination screen 76. The scan execution screen 80 includes a setting change icon 81 and an execution icon 82.

The setting change icons 81 are icons that receive designating operations by the user when the scan settings associated with the designated destination are to be changed. On each of the setting change icons 81, the current scan setting (e.g., the sheet size of "A4", the color setting of "monochrome", the resolution of "200 dpi") stored in association with the user ID "User1" in the management information 42 is indicated. The execution icon 82 is an icon that receives a designating operation by the user when starting the process of "Scan to Mobile" targeting the currently designated destination.

Returning to S35, when there is only one registered destination, the control program 40 proceeds to S38 to display, on the user IF 55, the scan execution screen 80 corresponding to the currently registered destination. When the execution icon 82 is designated and operated on the scan execution screen 80, the "Scan to Mobile" targeting the destination is executed. Concretely, the control program 40 controls the scanning engine 54 to scan the original document placed on the scanning table, and to generate the scan data. When the user touches and operates an icon to cancel the execution of the scanning process, the control program 40 does not execute the scanning process.

The control program 40 transmits the generated scan data to the service providing server 30. At this time, the control program 40 transmits, together with the scan data, a user ID related to the destination to the service providing server 30. When the service providing server 30 receives the scan data transmitted from the MFP 50, the control program 40 uploads the scan data to the memory of the MFP 50. At this time, the service providing server 30 stores, in a job management table for managing the scan data, a label name, a model name, a date and time of execution, a data size, and a thumbnail image included in the scan data in association with the transmitted user ID.

The service providing server 30 transmits a push notification ID and a URL that designates a destination for uploading the scan data to the push notification server 32 together with a request for transmitting the push notification. The push notification ID transmitted from the service providing server 30 is a push notification ID corresponding to a user ID of a destination (in this case, the terminal 10). When the push notification server 32 receives a request for transmitting a push notification, the push notification server 32 refers to the address of the device (here, the terminal 10) associated with the push notification ID in the notification information stored by the device. Then, the push notification is transmitted to the referenced address. In the present embodiment, the push notification includes a URL that designates a destination for uploading the scan data and web page data for displaying this URL on a screen.

When the application 21 of the terminal 10 receives the push notification, the application 21 displays, on the top screen, a notification image indicating that the push notification has been received. As a result, the user operating the terminal 10 can confirm that the scanned data directed to the terminal 10 as the destination has been uploaded to the service providing server 30. When the application 21 detects an operation on the notification image via the user IF 13, the browser program 22 displays a download designation screen using the web page data included in the push notification. The URL included in the push notification is displayed on the download designation screen. When the application 21 receives an operation to designate the URL on the download designation screen, the application 21 transmits a request to download the scan data having been uploaded to the designated URL to the service providing server 30.

Figure 11:
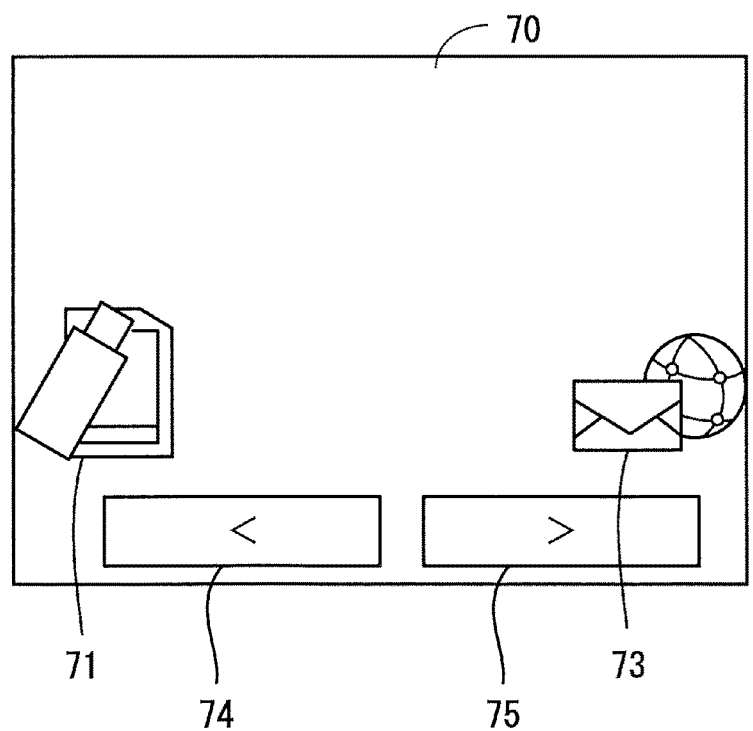
FIG. 11 illustrates an example of the function selection screen on which the operation icon is disabled.

On the other hand, when the user ID associated with the destination is not stored in the management information 42 (S31: NO), the control program 40 proceeds to S33 to display the function selection screen 70 on the user IF 55 on which the operation icons 72 corresponding to the process of "Scan to Mobile" are not displayed. As shown in FIG. 11, on the function selection screen 70 displayed in S33, only operation icons 71 and 73 are displayed. That is, the operation of designating the process of "Scan to Mobile" on the function selection screen 70 becomes unreceivable. Thereafter, the process of FIG. 7 is terminated.

The controller 56 of the MFP 50 is configured to determine whether the user ID is stored in the management information 42, and when it is determined that the user ID is not stored, the operation icon 72 for receiving the instruction operation of the process of "Scan to Mobile" is not displayed on the function selection screen 70. As a result, it is possible to prevent the user from inputting instructions for executing the process of "Scan to Mobile" when the scan data cannot be transmitted to the destination. As a result, the convenience of the user can be enhanced.

When the controller 56 determines that the user ID is stored in the management information 42, the controller 56 displays the operation icon 72 on the function selection screen 70 displayed on the touch panel 551. As a result, the user can visually recognize that the MFP 50 can be made to execute the process of "Scan to Mobile." Thus, the convenience of the user can be enhanced.

When the controller 56 determines that the user ID is not stored in the management information 42, the controller 56 does not display the operation icon 72 on the function selection screen 70. Accordingly, the user can visually recognize that the MFP 50 cannot be made to execute the process of "Scan to Mobile." As a result, the convenience of the user can be enhanced.

When a stored state of the user ID in the management information 42 is changed from a non-stored sate to a stored state and the process of "Scan to Mobile" becomes executable, the controller 56 notifies that the process of "Scan to Mobile" becomes executable on the standby screen 60. As a result, the user can recognize that the process of "Scan to Mobile" has become executable simply by checking the standby screen 60, thereby further enhancing the user's convenience.

The controller 56 of the MFP 50 stores the management information 42 updated in response to the operation of the terminal 10 in the memory 57. As a result, the configuration according to aspects of the present disclosures can be applied to the MFP 50 that can delete the user ID in response to the operation of the terminal 10.

Modification of First Embodiment

In S28 of the first embodiment described above, the operation icon 72 is disabled by hiding the same from the function selection screen 70. Alternatively, according to a modification of the first embodiment, the operation icon 72 may be disabled by configuring the operation icon 72 not to receive the operation while maintaining the displayed state. In such a case, the disabled operation icon 72 may be distinguished from the enabled operation icon 72 by, for example, displaying the disabled operation icon 72 grayed out.

In the first embodiment described above, when a new destination is registered, the notification icon 66 is displayed on the standby screen 60. Alternatively, according to a modification of the first embodiment, when a new destitution is registered, a notification indicating that the individual function of "Scan to Mobile" has become executable may be provided on the function selection screen 70.

In the first embodiment described above, the scan settings are stored in the management information 42. Alternatively, in a modification of the first embodiment, the scan settings may not be stored in the management information 42. In such a configuration, the control program 40 may receive changes of the scan settings individually via the user IF 55 when executing the process of "Scan to Mobile."

Second Embodiment

In the second embodiment, description are given mainly for a configuration that differs from the first embodiment. In the second embodiment, the same reference numbers are assigned to the parts same as in the first embodiment, and the description thereof will not be repeated.

In the present embodiment, when the user logs in the MFP 30 and the user ID of the logged-in user is stored, the controller 56 displays the operation icon 72 related to the individual function of "Scan to Mobile" are displayed for the user. Processes which are executed in response to operation of the scan designation icon 63 on the standby screen 60 will be explained with reference to FIG. 12.

In S40, the control program 40 determines whether a user is logging into the MFP 50. In the present embodiment, a login screen can be displayed on the touch panel 551 in response to an operation of the user IF 55. For example, the login screen has an input field for inputting a user name and password information, and a login button. Upon receiving the user's input of the user name and the password information and the operation of the login button, authentication is performed for the input user name and password information. When the authentication is successful, the MFP 50 can be shifted to the login state. When the MFP 50 is not in the logged-in state (S40: NO), the control program 40 proceeds to S33. On the other hand, when the MFP 50 is in the logged-in state (S40: YES), the control program 40 proceeds to S30.

In S30, the control program 40 refers to the management information 42 stored in memory 57. In S41, the control program 40 determines whether there is information on the logged-in user in the management information 42 based on a comparison result between a display name, which is information from which a destination can be recognized, stored in the management information 42 and a user name input on the login screen. Concretely, when the display name stored in the management information 42 matches the user name of the login user, the control program 40 determines that there is information on the login user in the management information 42. Optionally or alternatively, when the user name input on the login screen is included in the display name stored in the management information 42, the control program 40 may determine that the management information 42 stores information on the logged-in user. In this case, the user name and the display name need not correspond to each other on a one-to-one basis. That is, when the logged-in user has registered two or more devices as destinations, the user name and the display name may have one-to-many correspondence. When the control program 40 determines that the management information 42 includes information on the logged-in user (S41: YES), the control program 40 proceeds to S32 and controls the user IF 55 to display the function selection screen corresponding to the individual function of "Scan to Mobile" (see FIG. 8).

When the user ID stored in the management information 42 includes characters, etc. that can individually identify a user related to the destination, the control program 40 may determine, in S41, whether there is information on the logged-in user in the management information 42 based on a comparison result between the user ID stored in the management information 42 and the user name input on the login screen.

As in the first embodiment, when the control program 40 detects that the operation icon 72 has been operated on the function selection screen 70 displayed in S32 (S34: YES), the control program 40 proceeds to S35. Then, after executing S35 to S37, the control program 44) displays the scan execution screen 80 (FIG. 10) on the user IF 55 in S38.

Figure 12:
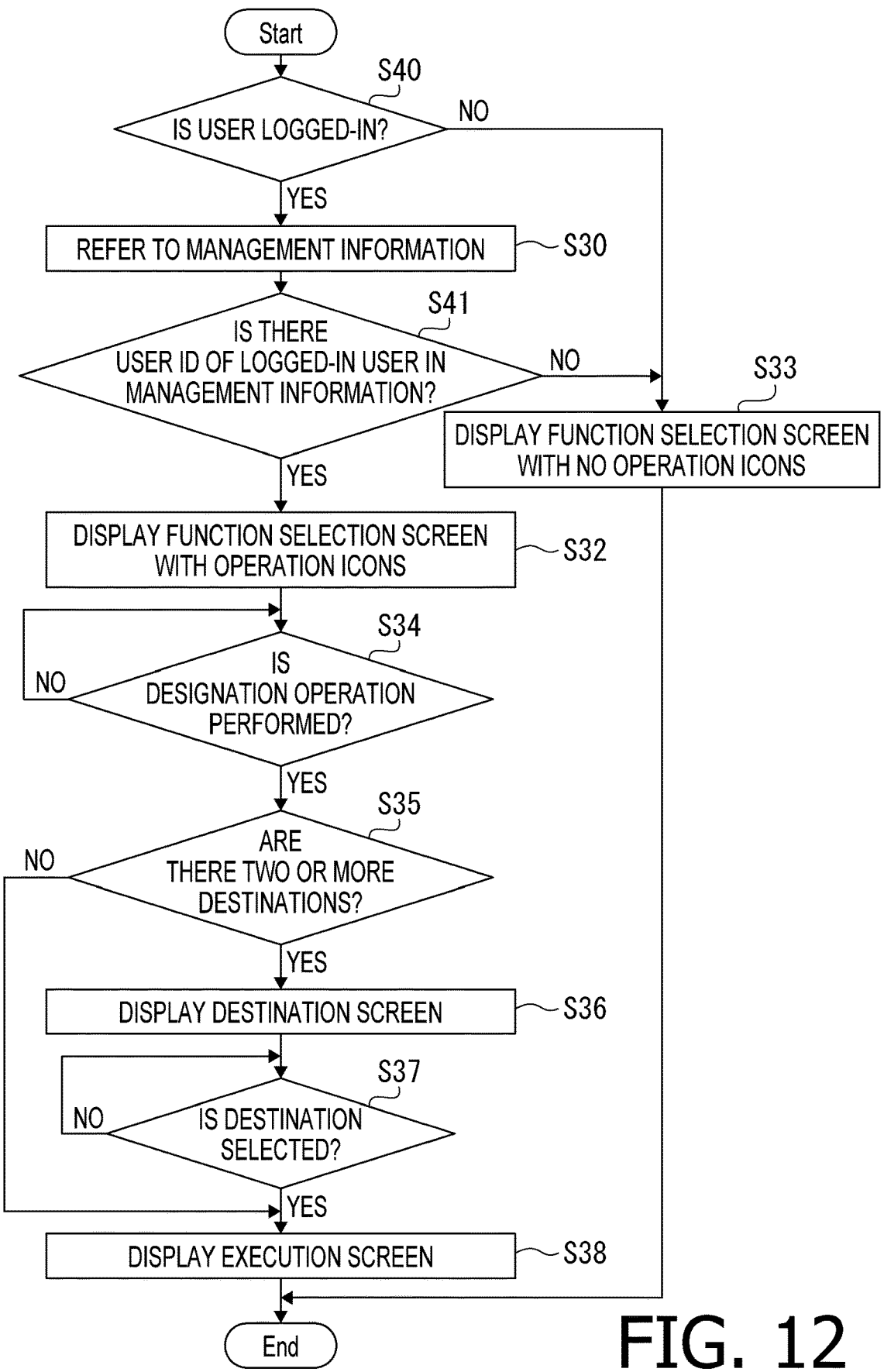
FIG. 12 is a flowchart illustrating a process of displaying an operation icon.

On the other hand, when no information on the logged-in user is stored in the management information 42 (S41: NO), the control program 40 proceeds to S33 and the function selection screen 70 (FIG. 11) in which the operation icon 72 corresponding to the process of "Scan to Mobile" is hidden is displayed on the user IF 55. That is, the instruction operation for the individual function of "Scan to Mobile" is made unreceivable. When S38 or S33 is completed, the process shown in FIG. 12 is terminated.

In the present embodiment described above, the control program 40 displays the operation icon 72 corresponding to the process of "Scan to Mobile" on the function selection screen 70 when it is determined that the user ID related to the logged-in user is stored in the management information 42. As a result, in a case where the logged-in user is logged into the MFP 50, when the user ID indicating the destination of the logged-in user is stored, the execution instruction of the process of "Scan to Mobile" is received, thereby further enhancing the convenience of the user.

Third Embodiment

In the third embodiment, the configuration that differs from the first embodiment will be mainly explained. In the third embodiment, the same reference numbers are assigned to the parts same as in the first embodiment, and the description thereof will not be repeated.

In the first embodiment, the user IF 55 of the MFP 50 has a touch panel 551. In the present embodiment, the user IF 55 of the MFP 50 does not have the touch panel 551, and has only the operation keys 552, which are physical keys. The control program 40 can set, for the operation keys 552, processes to be executed by the operation of the operation keys 552, among processes that can be executed by the MFP 50, respectively. Thereby, the user can cause the MFP 50 to execute the set processes by operating the operation keys 552, respectively.

Figure 13:
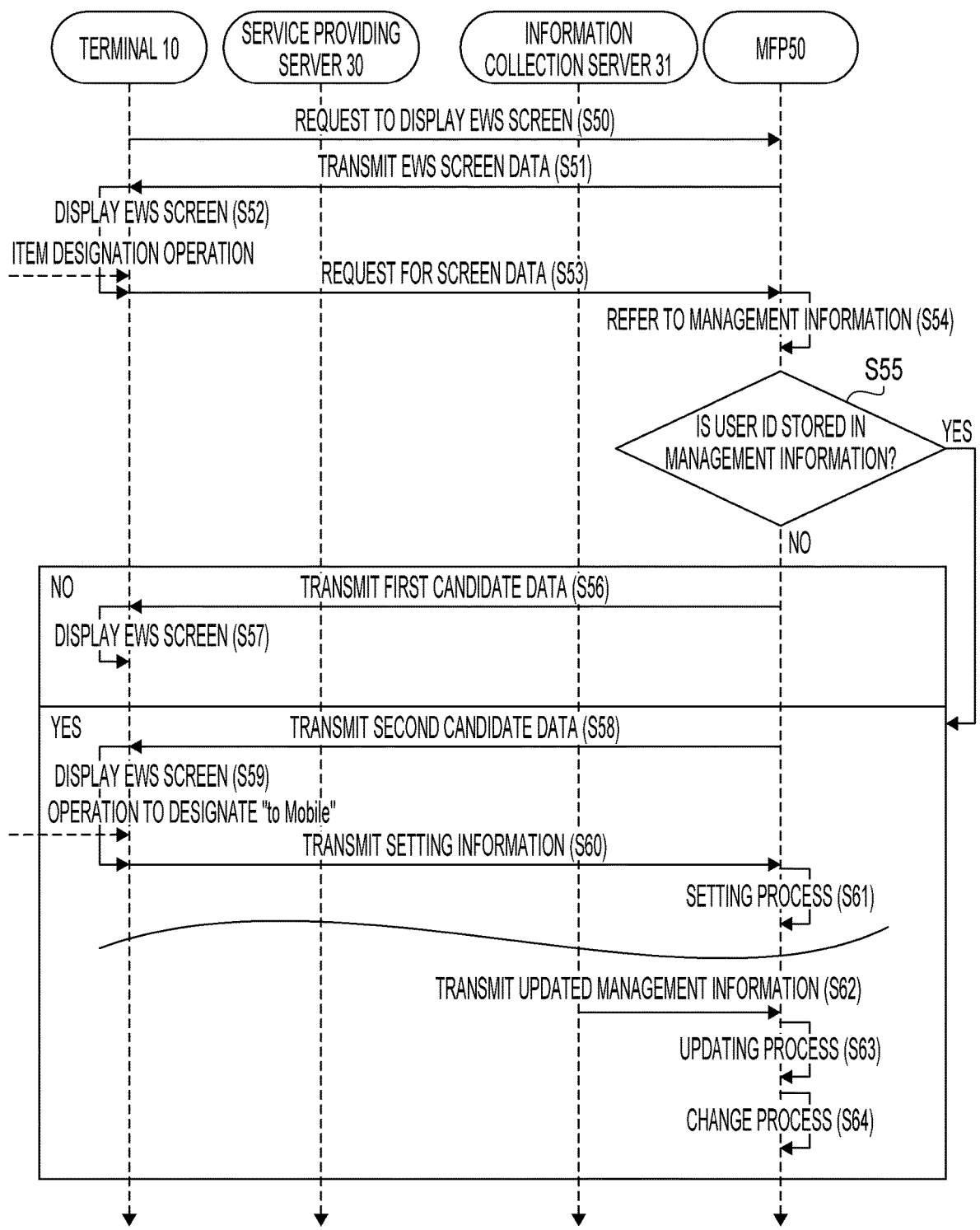
FIG. 13 is a sequence chart illustrating a process of displaying an operation icon.

FIG. 13 is a sequence chart illustrating a procedure of setting processes to the respective operation keys 552. In S50, the terminal 10 (i.e., the application 21) transmits a request for displaying a web screen to MFP 50. The MFP 50 of the present embodiment is equipped with a web server function (hereinafter referred to as EWS: Embedded Web Server), and is capable of displaying a screen in response to a request from a web browser such as the terminal 10. When the control program 40 of the MFP 50 receives a display request from the terminal 10, the control program 40 transmits, in S51, EWS screen data. The EWS screen data is web page data for displaying the EWS screen to the browser program 22 of the terminal 10.

Figure 14:
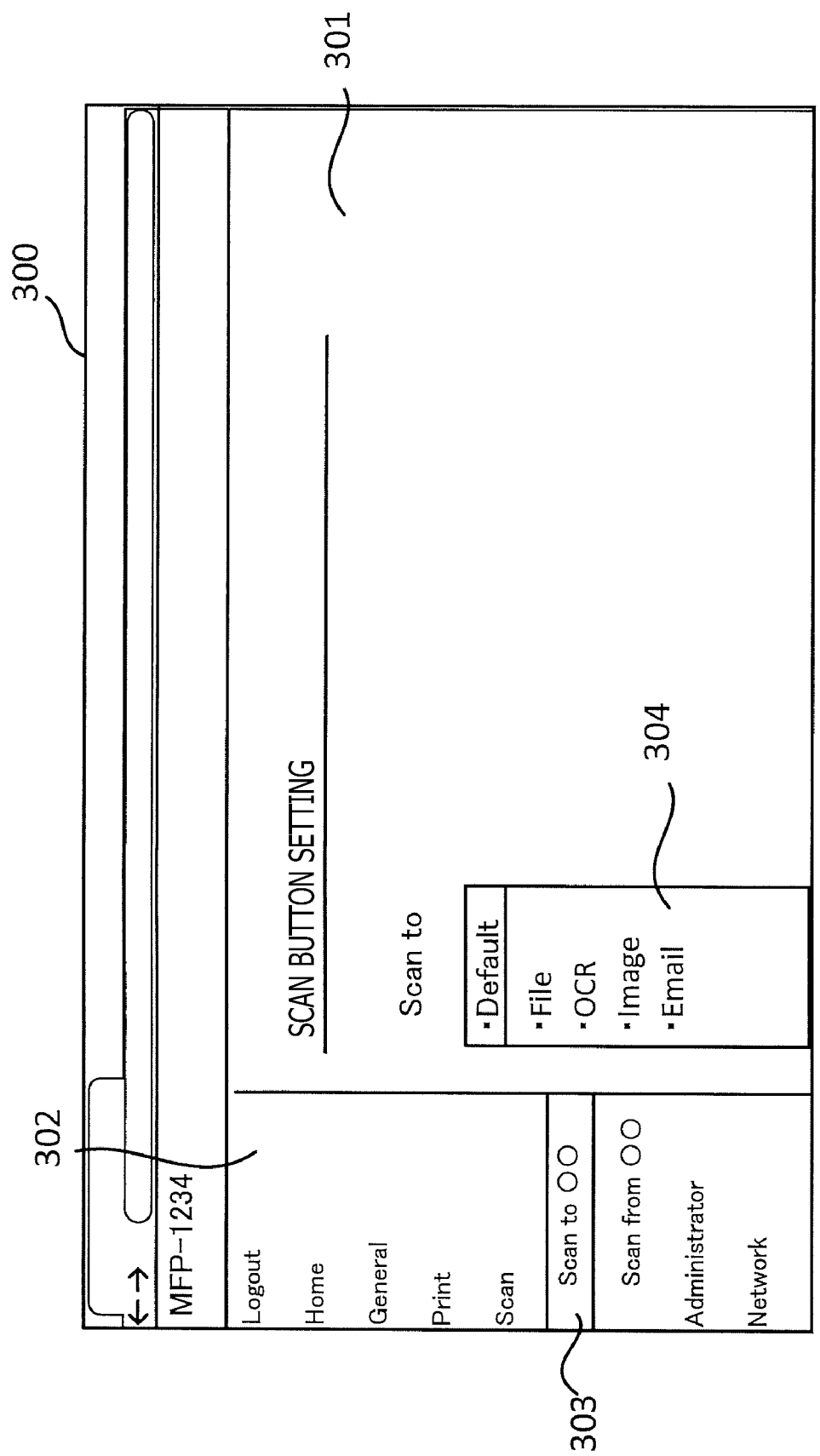
FIG. 14 illustrates an example of an EWS screen when no destination is registered.
Figure 15:
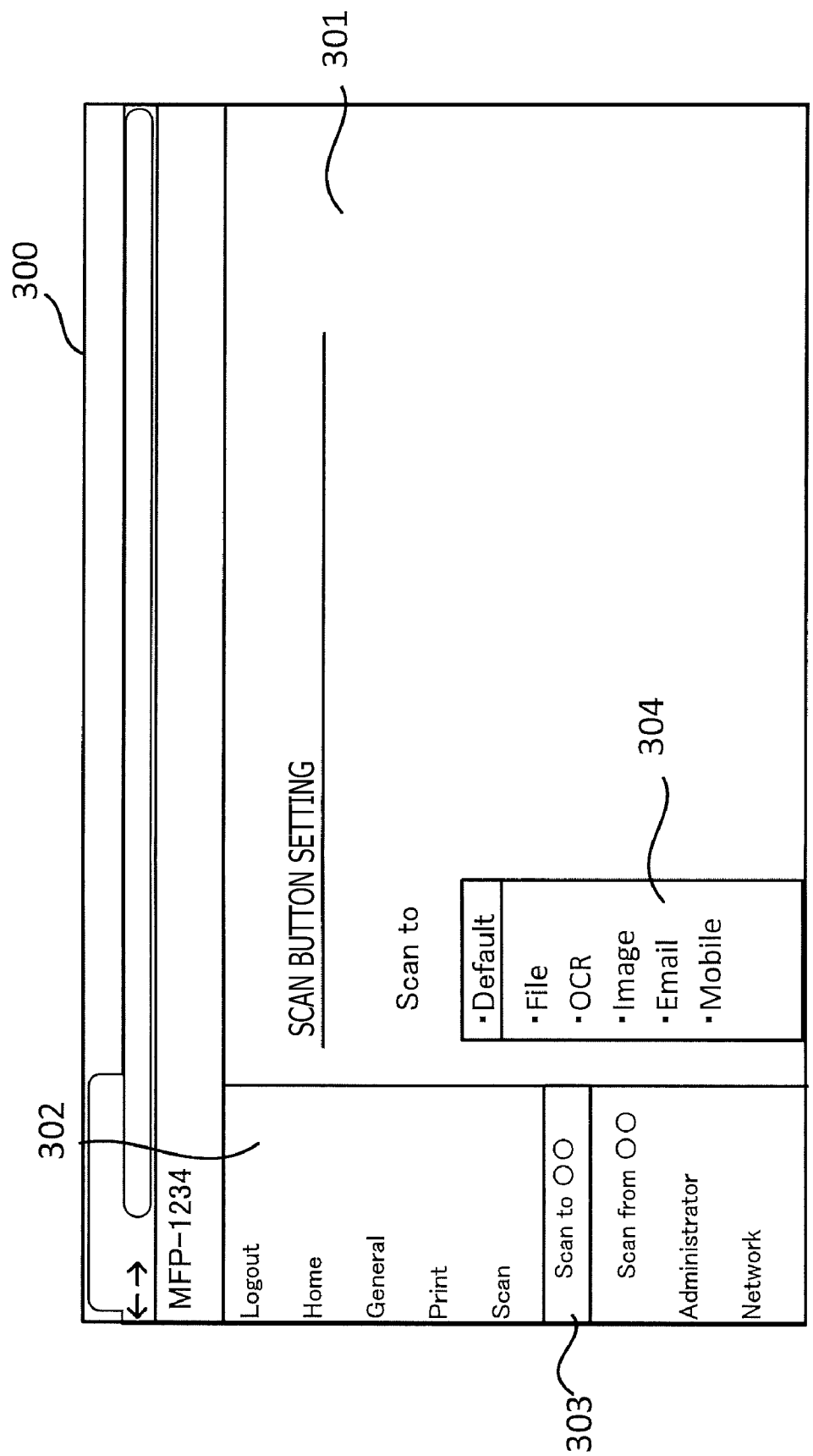
FIG. 15 illustrates an example of the EWS screen when a destination is registered.

When the control program 40 receives the EWS screen data, the control program 40 makes the browser program 22 display the EWS screen based on the received EWS screen data in S52. Each of FIGS. 14 and 15 illustrates the EWS screen 300 displayed on the user IF 55 by the browser program 22 as an example. The EWS screen 300 includes a setting area 301 and an item designation area 302. The item designation area 302 is an area in which items indicating services that can be provided by the MFP 50 (EWS) are listed. By operating the terminal 10, the user can designate the items displayed in the item designation area 302 to execute the services and make settings pertaining to the services. The setting area 301 is an area in which a screen related to the service designated in the item specification area 302 is displayed. In S52, since no item is designated on the item designation area 302, no screen is displayed in the setting area 301.

When the user performs an operation to designate an item 303 ("Scan to XX") included in the item designation area 302 on the EWS screen 300 displayed on the user IF 13 of the terminal 10, in S53, the application 21 requests the MFP 50 for screen data corresponding to the designated item 303. The screen data is data for displaying an image to be displayed in the setting area 301 of the EWS screen 300. In the present embodiment, the control program 40 does not transmit web page data for displaying the entire EWS screen 300, but transmits image data for displaying a part of the EWS screen 300 (in the present embodiment, the setting area 301) to the terminal 10 in response to the request transmitted from the terminal 10.

When receiving the request for the screen data, the control program 40 refers to the management information 42 in S54. Then, in S55, the control program 40 determines whether the user ID associated with the destination is stored in the management information 42. When it is determined that the user ID associated with the destination is not stored in the management information 42 (S55: NO), the control program 40 proceeds to S56. In S56, among the services categorized by the "Scan to XX" item 303, first candidate data, which is screen data for selecting a process other than the process of "Scan to Mobile," is transmitted to the terminal 10. In the present embodiment, the processes belonging to the item "Scan to XX" include the processes of "Scan to File," "Scan to OCR," "Scan to Image," "Scan to Email," and "Scan to Mobile" described above.

When the application 21 receives the first candidate data from the MFP 50, the application 21 causes the browser program 22, in S57, to display the EWS screen 300 using the first candidate data. According to the present embodiment, in the setting area 301 of the EWS screen 300, a drop box 304 is displayed to display the processes that can be designated. Concretely, as shown in FIG. 14, in the setting area 301, partial names of processes of "File," "OCR," "Image," and "Email" indicated by the first candidate data are displayed in the drop box 304. In other words, in S57, "Mobile," which is a partial name of the individual function of "Scan to Mobile," is not displayed in the drop box 304. Therefore, the user cannot set the process of "Scan to Mobile" to the process to be executed in response to operation of the operation key 552 by operating the EWS screen 300.

Returning to S55, when the user ID associated with the destination is stored in the management information 42 (S55: YES), the control program 40 proceeds to S58. In S58, the control program 40 transmits the second candidate data, which is screen data having all processes classified by the item 303 as candidates, to the terminal 10. That is, the process of "Scan to Mobile" is included as a candidate in the second candidate data.

When the application 21 receives the second candidate data from the MFP 50, the application 21 causes the browser program 22 to display the EWS screen 300 using the second candidate data at S59. On the EWS screen 300 displayed in S59, as shown in FIG. 15, the drop box 304 is displayed, and the partial names of all the processes of "File," "OCR," "Image," "Email," and "Mobile," which are categorized by the item 303, are displayed in the drop box 304. Therefore, the user can set the process of "Scan to Mobile" to the process to be executed by operating the operation key 552 by operating the EWS screen 300.

The description will be given below using the example of a case where the designation operation of "Mobile" is performed on the EWS screen 300 displayed on the terminal 10. The application 21 transmits the setting information including the process for which the designation operation by the user was received in S60.

When receiving the setting information transmitted from the terminal 10, the control program 40 performs, in S61, a setting process to set the process (in this example, "Scan to Mobile") to a process to be executed by operation of the operation key 552. As a result, the control program 40 executes the process of "Scan to Mobile" in response to operation of the operation key 552 by the user.

Thereafter, when the destination is deleted by operating the terminal 10, the management information 42 is overwritten with the management information 42 in which the information related to the destination targeted for deletion in the service providing server 30 (user ID, display name, and scan setting) has been deleted according to the process shown in FIG. 3. Then, in S62, the updated management information 42 is transmitted from the service providing server 30 to the MFP 50 via the information collection server 31.

When receiving the updated management information 42, in S63, the control program 40 updates the management information 42 in a batch by overwriting management information 42 with the received management information 42 in the memory 57. In S64, the control program 40 changes the process executed by the operation of the operation key 552 from the process of "Scan to Mobile" to another process. This is because the process of "Scan to Mobile" can no longer be executed due to the deletion of the destination. In the present embodiment, the control program 40 changes the process of "Scan to Mobile" to the process set by default. For example, the process set by default may be the process of "Scan to Media."

In the present embodiment described above, when the control program 40 determines that the user Ill is stored in the management information 42, the control program 40 displays the process of "Scan to Mobile" as a candidate for selection on the EWS screen 300, and when the process of "Scan to Mobile" is selected, the control program 40 sets the process of "Scan to Mobile" to the process to be executed by operating the operation key 552. On the other hand, when the control program 40 determines that the user ID is not stored in the management information 42, the control program 40 does not display the process of "Scan to Mobile" as a candidate for selection on the EWS screen 300. As a result, the same effect as the present disclosures can be achieved even in a configuration in which the presence or absence of an instruction to execute the process of "Scan to Mobile" can be switched by operating the terminal 10.

When the information regarding the destination including the user ID is deleted after the process of "Scan to Mobile" is set to the operation key 552, the control program 40 changes the process executed in response to the operation of the operation key 552 from the process of "Scan to Mobile" to the default process. As a result, when the user accidentally operates the operation key 552 in a state where the push notification ID is not stored, the MFP 10 starts executing some process. Therefore, as compared to a case where the MFP 10 does not operate in any way even when the operation key 552 is operated, it becomes possible to prevent the user from mistakenly recognizing trouble of the MFP 10.

Modification of Third Embodiment

In the third embodiment described above, a process executed by operation of the operation keys 552 is set on the EWS screen 300. Alternatively, in a modification of the third embodiment, on the EWS screen 300, processes to be executed by operation of the operation icons displayed on the touch panel 551 may be set on the EWS screen 300. In this case also, the control program 40 may set the process in S61.

In the third embodiment described above, by displaying the EWS screen 300 on the terminal 10, the process to be executed by the operation of the operation key 552 is set. Alternatively, in a modification of the third embodiment, the EWS screen 300 may be displayed on the MFP 10.

Further Modifications

The technology disclosed herein is not limited to the above-described embodiments and modifications, but can be modified into various forms to the extent that it does not deviate from aspects of the present disclosures.

In each of the above-described embodiments and modifications, the destination information is a push notification IL), and an explanation was provided using the individual function of "Scan to Mobile" as an example. Alternatively, when the control program 40 performs the individual function of "Scan to Email," the control program 40 may display or hide the operation icon 73 (FIG. 8) according to whether or not the email address that is the destination information has been deleted. In such a case, the control program 40 may display the function selection screen 70 with the operation icon 73 hidden in S33 of FIG. 7.

In each of the above-described embodiments and modifications, a user ID was used to identify the terminal 10 on the management information 42. Alternatively, identification information such as a serial number of the device or a program ID that identifies the application 21 may be used in the management information 42 instead of the user ID.

In the description above, the MFP 50 is referred to as a scanner. It should be noted that the above configuration is only an example, and the "scanner" may be a device equipped only with a scanning function.

What is claimed is:

1. A scanner, comprising:
   a scanning engine configured to scan an image on an original document and generate scan data representing the image on the original document;
   a memory;
   a user interface provided with an operation key configured to receive a user operation; and
   a controller configured to perform:
      receiving a user operation through the operation key;
      storing destination information in the memory, the destination information corresponding to a destination to which the scan data is to be transmitted;
      determining whether one or more pieces of destination information are stored in the memory;
      when it is determined, in the determining, that the one or more pieces of destination information are not stored in the memory, disabling the operation key provided to the user interface; and
      when it is determined, in the determining, that the one or more pieces of destination information are stored in the memory, enabling the operation key provided to the user interface,
   wherein, when the enabled operation key is operated in a state where the operation key is enabled, the controller is configured to perform:
      displaying, as candidate destinations, a list of one or more destinations corresponding to the one or more pieces of destination information, respectively;
      receiving a designating operation to designate a destination from among the displayed one or more destinations through the user interface; and
      transmitting the scan data as generated to the destination designated by the designating operation in response to receiving the designating operation; and
   wherein, in a state where the operation key is disabled, not receiving the user operation through the disabled operation key.

2. The scanner according to claim 1,
   wherein the user interface includes a display, and
   wherein, when it is determined in the determining that the destination information is stored in the memory, enabling the operation key by displaying an icon of the operation key on the display.

3. The scanner according to claim 2,
   wherein, when it is determined in the determining that the destination is not stored in the memory, disabling the operation key by not displaying the icon of the operation key on the display.

4. The scanner according to claim 1,
   wherein the controller is configured to perform:
      multiple scanning processes, wherein destinations of scan data for the multiple scanning processes are different from each other, and the destinations are indicated by different destination information;
      displaying a setting screen configured to receive a setting of a process to be performed in response to operation of the operation key from among the multiple scanning processes,
      determining whether the destination information is stored in the memory for each of the destinations of the multiple scanning processes;
      when it is determined, in the determining, that the destination information is stored in the memory, displaying a scanning process for which the destination information is stored as a selection candidate on the setting screen, and when the displayed scanning process is selected as a process to be performed in response to operation of the operation key, enabling the operation key; and when it is determined, in the determining, that the destination information is not stored in the memory, not displaying a scanning process for which the destination information is not stored on the setting screen.

5. The scanner according to claim 4,
wherein the controller is further configured to perform:
when the destination information is deleted from the memory after the operation key is enabled, setting a process to be performed in response to operation of the operation key from the scanning to a particular process different from the scanning.

6. The scanner according to claim 1,
wherein the controller is further configured to perform:
when the scanning becomes executable as a storing state of the destination information in the memory is changed from a non-stored state to a stored state, notifying that the scanning becomes executable.

7. The scanner according to claim 1,
wherein the controller is configured to receive an input, by a logged-in user, to the scanner,
wherein the destination information determined in the determining is information indicating an address related to the logged-in user, and
wherein, when it is determined, in the determining, that the destination information related to the logged-in user is stored, the controller enables the operation key.

8. The scanner according to claim 7,
wherein, in the storing, the controller stores information identifying the destination in the memory in association with the destination information, and
wherein, the controller is configured to determine, in the determining, that the destination information related to the logged-in user is stored in the memory based on a result of comparison of information input by the logged-in user with information stored in the memory and identifying the destination.

9. The scanner according to claim 1,
further comprising a communication interface,
wherein the controller is configured to communicate with a server via the communication interface, the server being configured to store the destination information, receive an instruction to add or delete the destination information to or from a terminal, update the destination information in accordance with the instruction as received, and transmit the updated destination information to the scanner, and
wherein the controller is configured to store, in the storing, the destination information transmitted from the server.

10. The scanner according to claim 9, wherein the controller is further configured to:
determine whether information about a new destination is stored in the memory; and
when determining that the information about the new destination is stored in the memory, enable the operation key.

11. The scanner according to claim 1, wherein the controller is further configured to:
determine whether two or more pieces of destination information are stored in the memory;

when determining that the two or more pieces of destination information are stored in the memory, display a list of two or more pieces of destination corresponding to the two or more pieces of destination information, respectively, when determining that the two or more pieces of destination information are not stored in the memory, display an instruction object to instruct to transmit scan data to a destination corresponding to destination information stored in the memory.

12. A non-transitory computer-readable recording medium for a scanner provided with a scanning engine configured to scan an image on an original document and generate scan data representing the image on the original document, a memory, a user interface provided with an operation key, and a controller, the recording medium containing computer-executable instructions which cause, when executed by the controller, the scanner to perform:

receiving a user operation through the operation key provided to the user interface;

storing destination information in the memory, the destination information corresponding to a destination to which the scan data is to be transmitted;

determining whether one or more pieces of destination information are stored in the memory;

when it is determined, in the determining, that the one or more pieces of destination information are not stored in the memory, disabling the operation key provided to the user interface;

when it is determined, in the determining, that the one or more pieces of destination information are stored in the memory, enabling the operation key provided to the user interface; and wherein, when the enabled operation key is operated in a state where the operation key is enabled:
displaying, as candidate destinations, a list of one or more destinations corresponding to the one or more pieces of destination information, respectively;
receiving a designating operation to designate a destination from among the displayed one or more destinations through the user interface; and
transmitting the scan data as generated to the destination designated by the designating operation in response to receiving the designating operation; and wherein, in a state where the operation key is disabled, not receiving the user operation through the disabled operation key.

13. The non-transitory computer-readable recording medium according to claim 12, wherein the scanner is caused to perform:
determining whether two or more pieces of destination information are stored in the memory;
when determining that the two or more pieces of destination information are stored in the memory, displaying a list of two or more pieces of destination corresponding to the two or more pieces of destination information, respectively,
when determining that the two or more pieces of destination information are not stored in the memory, displaying an instruction object to instruct to transmit scan data to a destination corresponding to destination information stored in the memory.

14. The non-transitory computer-readable recording medium according to claim 12,
wherein the scanner is further provided with a communication interface, wherein the scanner is caused to perform communicating with a server via the communication interface, the server being configured to:
store the destination information;
receive, from a terminal, an instruction to add or delete the destination information;
update the destination information in accordance with the instruction as received; and
transmit the updated destination information to the scanner, and
wherein the scanner is caused to perform:
store, in the storing, the destination information transmitted from the server;
determine whether information about a new destination is stored in the memory; and
when determining that the information about the new destination is stored in the memory, enable the operation key.

15. A scanning system comprising a server and a scanner,
wherein the server comprises a first memory that stores destination information corresponding to a destination to which scan data is to be transmitted, a first communication interface, and a first controller,
wherein the first controller is configured to perform:
receiving an instruction to add or delete the destination information to or from a terminal,
updating the destination information stored in the first memory in accordance with the instruction as received, and
transmitting the updated destination information to the scanner via the first communication interface,
wherein the scanner comprises a second communication interface, a second memory, a second controller, and a user interface having an operation key, and
wherein the second controller is configured to perform:
receiving the updated destination information from the server;
storing the updated destination information in the second memory;
receiving a user operation through the operation key;
determining whether one or more pieces of destination information are stored in the second memory;
disabling the operation key in the user interface when determining that the one or more pieces of destination information are not stored in the second memory in the determining;
enabling the operation key in the user interface when determining that the one or more pieces of destination information are stored in the second memory in the determining;
wherein, when the enabled operation key is operated in a state where the operation key is enabled, the second controller is configured to perform:
displaying, as candidate destinations, a list of one or more destinations corresponding to the one or more pieces of destination information, respectively;
receiving a designating operation to designate a destination from among the displayed one or more destinations through the user interface; and
transmitting the generated scan data to a destination indicated by the destination information when the enabled operation key is operated; and
in a state where the operation key is disabled, not receiving the user operation through the disabled operation key.

16. The scanning system according to claim 15, wherein the second controller is further configured to:
determine whether two or more pieces of destination information are stored in the memory;
when determining that the two or more pieces of destination information are stored in the memory, display a list of two or more pieces of destination corresponding to the two or more pieces of destination information, respectively,
when determining that the two or more pieces of destination information are not stored in the memory, display an instruction object to instruct to transmit scan data to a destination corresponding to destination information stored in the memory.

17. The scanning system according to claim 15, wherein the second controller is further configured to:
determine whether information about a new destination is stored in the second memory; and
when determining that the information about the new destination is stored in the second memory, enable the operation key.

* * * * *